United States Patent
White et al.

(10) Patent No.: US 8,842,118 B1
(45) Date of Patent: Sep. 23, 2014

(54) AUTOMATED IMAGE REPLACEMENT USING DEFORMATION AND ILLUMINATION ESTIMATION

(75) Inventors: Ryan White, San Carlos, CA (US); David Forsyth, Urbana, IL (US)

(73) Assignee: The Regents of the University of California, Oakland, CA (US)

( * ) Notice: Subject to any disclaimer, the term of this patent is extended or adjusted under 35 U.S.C. 154(b) by 1472 days.

(21) Appl. No.: 11/866,401

(22) Filed: Oct. 2, 2007

Related U.S. Application Data

(60) Provisional application No. 60/827,796, filed on Oct. 2, 2006.

(51) Int. Cl.
*G06T 15/50* (2011.01)
*G06T 15/60* (2006.01)

(52) U.S. Cl.
USPC ............................ 345/426; 345/619; 345/629

(58) Field of Classification Search
None
See application file for complete search history.

(56) References Cited

U.S. PATENT DOCUMENTS

| | | |
|---|---|---|
| 6,229,550 B1 | 5/2001 | Gloudemans et al. |
| 6,381,362 B1 | 4/2002 | Deshpande et al. |
| 6,529,613 B1 | 3/2003 | Astle |
| 6,750,919 B1 | 6/2004 | Rosser |
| 7,116,342 B2 | 10/2006 | Dengler et al. |
| 7,230,653 B1 | 6/2007 | Overton et al. |
| 7,737,976 B2* | 6/2010 | Lantin ........................... 345/427 |
| 8,303,505 B2* | 11/2012 | Webler et al. .................. 600/447 |
| 2005/0175101 A1* | 8/2005 | Honda et al. ............. 375/240.16 |
| 2006/0277571 A1* | 12/2006 | Marks et al. ..................... 725/37 |
| 2010/0007665 A1* | 1/2010 | Smith et al. .................... 345/473 |

OTHER PUBLICATIONS

H. Fang et al. "RotoTexture: Automated Tools for Texturing Raw Video" IEEE Transactions on Visualization and Computer Graphics 12(6), Nov. 2006, pp. 1580-1589.
H. Fang et al. "Textureshop: Texture Synthesis as a Photograph Editing Tool", ACM Trans. Graph., 23(3):354-359, 2004.

* cited by examiner

*Primary Examiner* — Said Broome
(74) *Attorney, Agent, or Firm* — John P. O'Banion

(57) ABSTRACT

A method which makes it possible to replace a reference pattern (aka texture) on a video of clothing is described. For example, a video of a T-shirt with the text "UCLA" could be edited to say "UC Berkeley" with minimal user intervention. The method is novel because it separates the problem into two parts: erasing the old texture (while properly accounting for lighting) and adding the new texture (properly deformed to appear on the shirt. This decomposition creates realistic images with simple tracking models of the cloth. It is believed that this method may be used for targeted audience sales techniques, with static or dynamic replacement images replacing images on warping or otherwise deforming surfaces, in addition to other perspective deformations. Potentially, real-time image replacements using the techniques taught here could be used for live activities or real-time video feeds.

19 Claims, 19 Drawing Sheets

AUTOMATED IMAGE REPLACEMENT USING DEFORMATION AND ILLUMINATION ESTIMATION

CROSS-REFERENCE TO RELATED APPLICATIONS

This patent claims benefit of priority to U.S. provisional patent No. 60/827,796 filed on Oct. 2, 2006, which is hereby incorporated by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Appendix B, entitled "Automated Image Replacement Code" referenced herein is contained in two files entitled: (1) "B07_027_2A_generic_all.txt" created on Oct. 2, 2007 and having a 42k byte size; and (2) "B07_027_2A_custom_all.txt" created on Oct. 2, 2007 and having a 86k byte size. The computer program code, which exceeds 300 lines, is submitted as a computer program listing appendix through EFS-Web and is incorporated by reference herein.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to modifying an input image that has some or all of a reference image within it, and more particularly to replacing the reference image with a replacement image that has the same illumination and deformation properties of the reference image.

2. Description of Related Art

The following publications describe related art and are incorporated herein by reference in their entirety.

Paul Debevec, "Rendering Synthetic Objects Into Real Scenes: Bridging Traditional And Image-Based Graphics With Global Illumination And High Dynamic Range Photography", Proceedings of SIGGRAPH 98, Computer Graphics Proceedings, Annual Conference Series, pages 189-198, July 1998.

Hui Fang and John C. Hart, "Textureshop: Texture Synthesis As A Photograph Editing Tool", ACM Trans. Graph., 23(3):354-359, 2004.

D. A. Forsyth, "Shape From Texture Without Boundaries", Proc. ECCV, volume 3, pages 225-239, 2002.

D. A. Forsyth and A. P. Zisserman, "Reflections On Shading", IEEE T. Pattern Analysis and Machine Intelligence", 13(7):671-679, 1991.

J. Haddon and D. A. Forsyth, "Shading Primitives", Int. Conf. on Computer Vision, 1997.

J. Haddon and D. A. Forsyth, "Shape Representations From Shading Primitives", European Conference on Computer Vision, 1998.

Anthony Lobay and D. A. Forsyth, "Recovering Shape And Irradiance Maps From Rich Dense Texton Fields", Proceedings of Computer Vision and Pattern Recognition (CVPR), 2004.

D. G. Lowe, "Distinctive Image Features From Scale-Invariant Keypoints", IJCV, 60(2):91-110, November 2004.

Julien Pilet, Vincent Lepetit, and Pascal Fua, "Real-Time Non-Rigid Surface Detection", IEEE Conference on Computer Vision and Pattern Recognition (CVPR), 2005.

Leonid V. Tsap, Dmitry B. Goldgof, and Sudeep Sarkar, "Non-Rigid Motion Analysis Based On Dynamic Refinement Of Finite Element Models", IEEE Trans. Pattern Anal. Mach. Intell., 22(5):526-543, 2000.

Yizhou Yu, Paul Debevec, Jitendra Malik, and Tim Hawkins, "Inverse Global Illumination: Recovering Reflectance Models Of Real Scenes From Photographs", Alyn Rockwood, editor, Siggraph99, Annual Conference Series, pages 215-224, Los Angeles, 1999. Addison Wesley Longman.

Ruo Zhang, Ping-Sing Tsai, James Edwin Cryer, and Mubarak Shah, "Shape From Shading: A Survey", IEEE Transactions on Pattern Analysis and Machine Intelligence, 21(8):690-706, 1999.

Ryan White and David Forsyth, "Combining Cues: Shape From Shading And Texture," EELS Department, University of California, Berkeley, Technical Report No. UCB/EECS-2005-14, http://www.eecs.berkeley.edu/Pubs/TechRpts/2005/EECS-2005-14.pdf, Nov. 17, 2005.

Ryan White, David Forsyth, "Combining Cues: Shape From Shading And Texture," IEEE Conference on Computer Vision and Pattern Recognition, 2006.

The following patents describe related art and are incorporated herein by reference in their entirety.

U.S. Pat. No. 6,229,550, entitled "Blending a graphic".

U.S. Pat. No. 6,381,362, entitled "Method and apparatus for including virtual ads in video presentations".

U.S. Pat. No. 6,529,613, entitled "Motion tracking using image-texture templates".

U.S. Pat. No. 6,750,919, entitled "Event linked insertion of indicia into video".

U.S. Pat. No. 7,116,342, entitled "System and method for inserting content into an image sequence".

U.S. Pat. No. 7,230,653, entitled "Method and apparatus for real time insertion of images into video".

Reference to the above publications and patents is for the purpose of describing related art and shall not be construed as an admission that the publications or patents are, or are considered to be, material to patentability.

BRIEF SUMMARY OF THE INVENTION

One aspect of the invention is a method for modifying an image comprising the steps of: providing a reference image; and a means for replacing the reference image on an input image with a replacement image. The means for replacing step may comprise: independently performing steps comprising: estimating illumination to form an illumination image; and estimating deformation to create a deformation set, wherein the deformation set maps the replacement image to a deformed replacement image. The same deformation set is used to map the target image into the deformed replacement image as is used to map the reference image to the depiction of the reference image within the input image. Here, the means for replacing step may further comprise: applying the illumination image to the deformed replacement image to form a completed replacement image; and compositing the completed replacement image onto the input image to form a replaced input image.

In another aspect of the invention, the estimating illumination step may comprise: forming a target region by locating a set of pixels depicting at least part of the reference image within the input image; classifying each of the target region pixels into one color bin of a set of color bins representative of the reference image; then multiplying each pixel in the target region by an illumination multiplier associated with the color bin classified for the pixel to produce an illumination image.

In still another aspect of the invention, the estimating deformation step may comprise:
a. forming a target region by locating a set of pixels depicting at least part of the reference image within the input image;
b. determining bins of substantially uniform color within the target region by using steps comprising:
   i. forming a color gradient of the target region of the input image;
   ii. agglomerating groupings of substantially uniform color within a color threshold of a local minimum within the color gradient;
   iii. classifying each pixel in each agglomerated grouping to a color bin, each color bin representative of the reference image;
   iv. detecting pixels in the target region where the color gradient exceeds the color threshold of the local minimum of the color gradient; then labeling such detected regions as ambiguous pixels;
   v. determining color values for the ambiguous pixels from the agglomerated groupings with numerical methods; then
   vi. agglomerating the ambiguous pixels to their corresponding color bins;
c. regressing an initial deformation set that maps the reference image to the deformed replacement image in an iterative fashion until a mapping error is less than or equal to a deformation limit; wherein the color bins of the deformed replacement image correspond to a set of color bins for the reference image.

The illumination multiplier may be determined through steps comprising: determining a reference color, where the reference color has a reference color irradiance; and dividing an irradiance of each of the color bins (of the set of color bins representative of the reference image) by the reference color irradiance.

A computer readable medium may store the computer program comprising the steps of the method described herein for modifying an image by replacing a reference image with a replacement image as described above. Additionally, an input image may be transmitted as a signal input, processed, and the output image with the replaced image transmitted as an output signal. Such signals may originate anywhere, and may be output to anywhere, so long as there is some form of electromagnetic communication present, even if only in one direction.

In yet another aspect of the invention a method for retexturing an object from a single viewpoint is disclosed, where the method of retexturing comprises creating realistic video with independently calculated illumination estimates and deformation estimates. Here, the illumination estimate may be made by estimating the local irradiance of an input image to provide strong cues of a fine scale structure in an actual lighting environment. The deformation estimate may be calculated by tracking a deformed reference image in two dimensions to replace the deformed reference image with a deformed replacement image.

The method of estimating local irradiance may comprise: classifying pixels according to color; and computing the irradiance for a given color.

In another aspect of the invention, an image-based rendering method for retexturing fast-moving, deforming objects in video while preserving original lighting is disclosed, comprising: using correspondence reasoning to obtain a deformation estimate; and using color reasoning to recover an illumination estimate. Here, the deformation estimation may be obtained by using a reference image. Additionally, an undeformed frontal view of the reference image may be obtained from images of the deformed surface. This undeformed frontal view of the reference image may be computed by estimating the undeformed frontal view of small triangular shaped portions of the reference image separately and compositing them together. The small triangular shaped portions are obtained by estimating a deformation set for each of the reference images depicted on the deformed surface within the input image. Each small triangular region exists in the deformed surface within the input image and an undeformed frontal view of the small triangular region can be computed by using standard structure-from-motion techniques. The resulting frontal view of the small triangular regions may then be composited together.

In another aspect of the invention, the deformation estimate may be obtained by using a known, engineered pattern. The engineered pattern may be formed by selecting basis colors that find low frequency use in the particular video segment. For instance, with forest scenery which are predominantly greens and browns, bright yellows and reds would find relatively low frequency use. For desert scenery, other colors, such as bright blue or green would find relatively low frequency use. For more general use, one can analyze a large number of videos to determine infrequent colors that occur in most settings.

The engineered pattern may be built by using a custom printed pattern composed of geometric primitives to create high quality deformation estimates. This may be accomplished by using a triangle mesh to represent the deformation estimate; and splitting triangles as the deformation estimate is iteratively refined.

The resulting deformation estimate (otherwise known as the deformation_set) would incorporate such information as the location and scale of the reference image within the input image, and potentially some measurement of the degree of error of the deformation estimate.

Subsequently, one may composite the deformation estimate of the replacement image and the illumination estimate to produce an output frame that comprises the deformed reference image replaced with the appropriately deformed and illuminated replacement image. In further detail, this method may comprise: building a color look-up table that indicates, for each of a plurality of independent basis colors present in a screen print of the reference image, the appearance of a reference color in illumination that produces a given set of image R, G and B values from each independent basis color; and at each reference image pixel, determining what (if any) basis color is present, and using the color look-up table to estimate the appearance of the reference color at that location of the reference image pixel.

In the method above, the color look-up table may be built by using a color classifier to classify pixels from one of the basis colors that lie next to pixels produced by a reference color. Here, the color classifier may be used for determining what basis colors are present from a pool of the classified pixels; and presenting RGB values to the color look-up table indicated by that basis color. An alternate method for building the color look-up table involves using a modified Poisson blending technique, where the intensities are multiplied by unknown multipliers. The solution to the modified Poisson system determines the values for the color look-up table.

Once the deformation estimate and illumination estimate are formed a composited image may be formed with the steps comprising: applying the deformation estimate to the replacement image to form a deformed replacement image; applying the illumination estimate to the deformed replacement image to obtain a completed replacement image; compositing the completed replacement image with the input image to replace the pixels in the reference image, blending nearby pixels; and using the original image pixels for the rest of the image to obtain a composited image.

Given an initial reference image (which may be a logo or other trademarked or copyrighted graphic), the methods above may be applied using high performance graphics processing units (GPUs) to supply retexturing power to replace the initial reference image with a replacement image that has been appropriately deformed and illuminated respectively with deformation estimates and illumination estimates so that the appearance of the replacement image appears that it was always the original image present on the input image. With sufficient processing power, it is thought that this method may be applied in real time. Thus, a locally produced video with reference images of Napa Valley wines may be replaced as needed by Vermont wines, French wines, or other replacement reference images.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
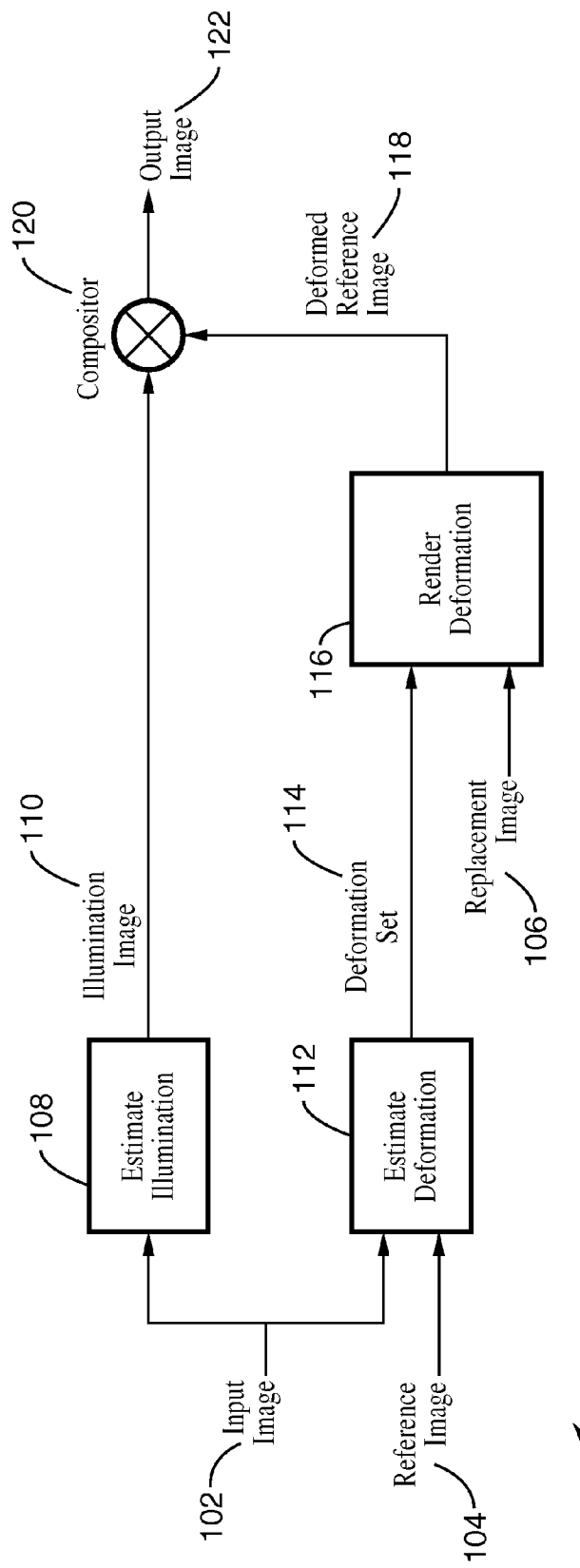
FIG. 1 is a flowchart of one aspect of the image replacement method taught in this invention.

Referring more specifically to the drawings, for illustrative purposes the present invention is embodied in the method generally shown in FIGS. 1A-5F. It will be appreciated that the apparatus may vary as to configuration and as to details of the parts, and that the method may vary as to the specific steps and sequence, without departing from the basic concepts as disclosed herein.

DEFINITIONS

The following definitions are provided to facilitate an understanding of the terminology used herein. It is intended that those terms not present in these Definitions be given their plain meaning as understood by those persons having ordinary skill in the art.

"Computer" means any device capable of performing the steps, methods, or producing signals as described herein, including but not limited to: a microprocessor, a microcontroller, a digital state machine, a field programmable gate array (FPGA), a digital signal processor, a collocated integrated memory system with microprocessor and analog or digital output device, a distributed memory system with microprocessor and analog or digital output device connected by digital or analog signal protocols.

"Computer readable medium" means any source of organized information that may be processed by a computer to perform the steps described herein to result in, store, perform logical operations upon, or transmit, a flow or a signal flow, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FPGAs), flash random access memory (flash RAM); and information transmitted by electromagnetic or optical methods including, but not limited to, wireless transmission, copper wires, and optical fibers.

"Texture", as used herein, means an image that may, or may not, have a repeating pattern, such as a generic image.

1. Introduction

A texture (to those skilled in the art of computer vision) is a repeating visual pattern of some sort, such as pores in skin, hair, fabric weaves, or artistic repetitions of any sort. Retexturing is the process of replacing one texture with another. In one sense, retexturing is the process of removing a reference image from target region, and instead placing a replacement image in its place.

Here, texture means an image that may not even have a repeating pattern, such as a generic image. Thus, a texture may be either patterned or unpatterned. Screen printed graphics may or may not have repeating elements, thus would be described as a texture in this work.

Retexturing is a useful and pleasing image level utility. Retexturing clothing has a variety of applications if well done. First, one could sell the advertising space on the back of a sports-player's shirt multiple times—different advertisements could be retextured for different television markets. Second, one could change the clothing of figures in legacy images or footage to meet modern tastes. Additional applications could include modification of the graphical content of billboards, posters, logos, cans, cars, trucks, clothing, and virtually any form of printed branding or marketing.

A growing theme of modern computer vision is the number of useful applications that are possible with little or no shape information. In this invention, high quality images are rendered with apparently realistic lighting conditions without any knowledge whatsoever of the 3D geometry of the elements in an image. This rendering may be achieved without high accuracy in deformation estimation. Furthermore, evidence suggests that good irradiance estimates may indeed be very useful in sustaining a human perception of a 3D shape.

By way of example, and not of limitation, the present invention generally comprises a method for retexturing non-rigid objects from a single viewpoint. Without reconstructing 3D geometry, realistic video with shape cues are created by independently determining: 1) illumination estimates of the potentially deformed reference image, and 2) determining a deformation required to map an undeformed reference image to the deformed state. The deformation information allows the erasure of the old texture (the deformed reference image). Further, if substitution is required, the deformed reference image may be overwritten with a new, replacement image. The illumination estimates of the local irradiance provide strong visual cues of fine scale structure in the actual lighting environment, automatically correcting for changes in lighting conditions, directionality of light, and the spectral content of the illumination. This is all accomplished without knowledge of any specific light source in the image.

Computing irradiance from an explicit correspondence is difficult and unreliable, so here the reconstructions are images created from a limited palette of colors, as is commonly used in graphic arts world-wide. Common printing techniques use only a finite number of colors to reduce printing costs. In this invention, irradiance estimates are computed in a local manner where pixels are initially classified according to color, and then irradiance is computed given the classified color. Results are demonstrated in both a special shirt designed for easy retexturing and on natural clothing with screen prints that have no special retexturing design of any sort.

Because of the quality of the results of the retexturing achieved in this invention, it is believed that this technique would have wide applications in special effects and advertising. Thus, a branded logo that appears in a video frame may be removed, genericized, or replaced with one having requisite licensing rights.

The image-based rendering technique used here allows retexturing of fast-moving, deforming objects in a video stream while preserving the original lighting. The methods used here apply simple correspondence reasoning to recover texture coordinates, and color reasoning to recover a detailed, dense irradiance estimate. The resultant retextured images have textures that appear to be stable on the surface, and at spatial scales that are never needed. It is believed that the resulting excellent irradiance estimates are a significant component of the sense of shape that is produced.

1.1 Procedure Overview

Refer now to FIG. 1, which is a flow chart 100 for retexturing as describe this in this invention. An input image 102, a reference image 104, and a replacement image 106 are provided as input to this processing pipeline. In this invention the input image 102 is processed in an upper part of the pipeline by estimating illumination 108 to produce an illumination image 110. In the lower part of the pipeline, the input image 102 and the reference image 104 are used to estimate deformation 112 to produce a deformation set 114. The deformation set 114 and the replacement image 106 are input into rendering stage to render the deformation 116 of the replacement image 106 to produce a deformed reference image 118. The illumination image 110 and the deformed reference image 118 are composited by compositor 120 to produce an output image 122. These steps will be further described below.

In more general terms, the input image 102 may be either a photograph or a single frame in video scene comprised of a plurality of single frames. Typically, a video comprises 24 or more frames per second times the length of the video in seconds. The reference image 104 is some visual element present in some or all of the frames. The object here is to locate at least some of the reference image 104 within the input image 102, and ultimately to replace those portions of the reference image 104 found in the input image 102, with suitably replaced corresponding portions of the replacement image 106. Should a multiplicity of reference images 104 be found in the input image 102, then the replacement image 106 would be suitably replaced with the corresponding portions of the replacement image 106. Thus, by way of example, if the reference imager were a "smiley face" and the replacement image a "devil face", then wherever an entire or portion of a smiley face were found, it would be replaced with a devil face. The replacement would be done in such a way that the illuminations and deformations that were extant in the smiley faces of the input image 106 would also be extant in the devil face replacements.

2. Lighting Replacement: Modeling Irradiance

Careful estimates of irradiance are very useful, and appear to create a powerful visual impression of shape. Irradiance estimates are significant for renderings of clothing probably due to "igniting", an effect which occurs when a surface is illuminated with less light than it otherwise would because other surfaces obstruct the illumination. One highly significant form of igniting occurs locally, at the bottom of folded cloth gutters, where most incoming light is blocked by the sides of the gutters. This effect appears commonly on clothing and is quite distinctive. It is due to small folds in the cloth forming gutters and shadows, and could not be represented with a parametric irradiance model unless one had a highly detailed surface normal vector map of the cloth.

However, in generic images, one does not have a detailed surface normal vector map or depth map. Furthermore, as discussed later in section 3, the estimates of material coordinates are of limited accuracy due to pixellation effects and to shading effects where regions of a deformed visual image go very dark to black (in these situations, it is difficult or impossible to determine where an edge might be). What this means is that it is not wise to estimate irradiance by assuming that the estimate of material coordinates gives an albedo (by reference to the original texture map) and from this irradiance can be obtained. A single pixel error in position (due to pixilation or other problem) on the texture map can, for example, mean that an image location produced by a dark patch on the shirt is ascribed to a light patch on the shirt—which would result in a catastrophically inaccurate irradiance estimate. This probably explains why correspondence tracking methods do not estimate irradiance or use it to retexture—the correspondence is not pixel accurate, meaning that irradiance estimation would probably fail.

Figure 2A:
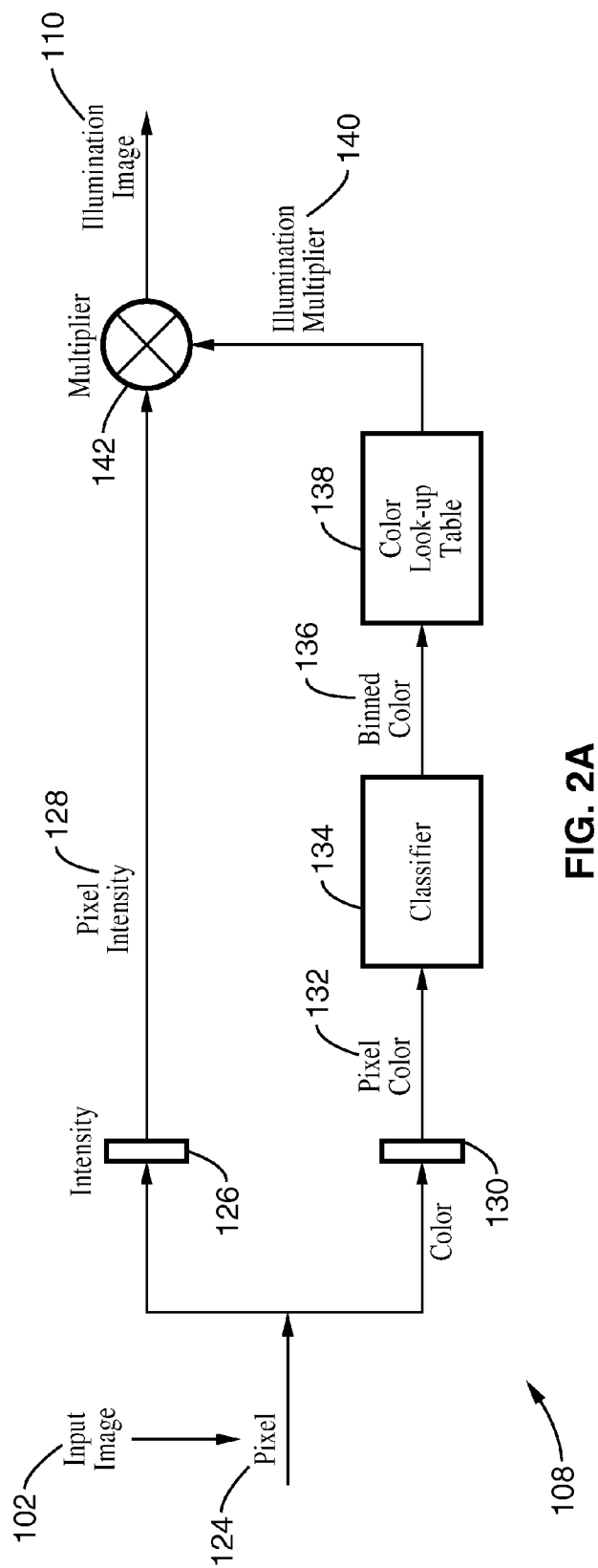
FIG. 2A is a more detailed flowchart of the illumination estimation method taught in this invention.

Refer now to FIG. 2A, which is a detailed flowchart of the illumination estimation 108 pipeline. In this processing step, individual pixels 124 of the input image 102 (for increased efficiency and speed, only those pixels that depict the reference image within the input image are input) are fed through the illumination estimation 108 pipeline in the following fashion. The intensity is stripped 126 from the pixel 124. This may be either the B value of LAB color space, or the V value of the HSV color space. Other color spaces could be used where there was an independent value of the pixel intensity 128, which is the result of this step. In this step, no color information is required once the pixel 124 is represented as color and intensity.

The color value is obtained 130 to produce a pixel color 132 that does not require any intensity information. The pixel color 132 is classified by a classifier 134 bins the pixel color 132 into a binned color 136. The collection of all binned colors 136 that are used by the classifier 134 should form a color basis set for the representation of the reference image, whereby the color basis set substantially represents the reference image as it appears on the input image 102.

After the binned color 136 is obtained for the particular pixel 124, it is used as an index into a color look-up table 138. The output of the color look-up table is an illumination multiplier 140. The illumination multiplier 140 formed by forming a ratio of the irradiance of the binned color 136 relative to a reference color that forms a large portion of the surrounding background of the reference image on the input image 102. Normally, the illumination multipliers 140 are only calculated once per input image, but could potentially be carried over frame to frame in a video under substantially similar lighting conditions. The illumination multipliers 140 can even be computed on a frame by frame basis and temporally smoothed for increased consistency. At this juncture, the pixel intensity 128 is multiplied by the illumination multiplier 140 in a multiplier 142 to form one of the pixel entries to the illumination image 110. This process is repeated over the entire pixel 124 range of interest.

Additional performance improvements may be possible in the illumination estimation 108 step in that the entire input image 102 is not needed, just the reference region where the input image 102 contains some or all of the reference image 104.

What is done in the illumination estimation is to use an assumption that the reference image 104 is screen-printed or otherwise produced using a relatively small set of highly colored dyes in regions of constant color (known as the reference color). Furthermore, it is assumed that the reference image 104 is sufficiently complex that the basis colors comprising the reference image 104 will be juxtaposed next to a reference color (which we call white, though any color could be used). The reference color will usually comprise the background that the potentially deformed reference image 104 is placed. The background may be a racing car, hats, shirts, boxes, jackets, pants, shorts, bottles, cans, motorcycles, underwear, bumper stickers, tattoos, bandanas, posters, or other surface that is typically printed upon with a logo, pattern, or other image. In world-wide culture such reference images are ubiquitous and highly frequent, as the result of hundreds of years of advertising.

In the case where a limited pallet of basis colors is used in creation of a reference image 104, a formal estimate of irradiance is not needed. Instead, at any given point in the image, all that is needed is an estimate of what the reference color would look like, if it appeared at the given location of the pixel 124 being processed. By using this method, difficulties of scaling between pixel values and radiance are avoided.

To summarize and restate somewhat, this illumination estimate 108 can be obtained in three steps. First, a color look-up table 138 is built that indicates, for each of the binned colors 136 in the reference image 104, what the reference (or background) color looks like in an illumination that produces a given set of image R, G and B values from a particular binned color 136. Second, at each input image 102 pixel 124, a classifier 134 determines what (if any) binned color 136 basis is present, followed by using the color look-up table 138 to estimate the apparent illumination of the reference color at that pixel 124 location by multiplying the pixel intensity 128 by the illumination multiplier 140 output from the color look-up table 138 to produce a single pixel of the illumination image 110. After all input image 102 pixels 124 are processed for illumination estimation 108, the resulting illumination image 110 is smoothed using Gaussian or other numerical techniques.

2.1 Estimating Illumination Multipliers

Irradiance is in fact not required. It is sufficient to know what a reference color (for example, white) patch would look like, when a given dye patch has a given appearance. This information can be obtained by regressing from observations. Initially, one table for each basis binned color in the reference image 104 is built, using the following approach. A color classifier 134 (described further below) is used to identify pixels 124 from that binned color that is adjacent to pixels produced by patches of the reference color (for example, white). It is reasonable to assume that, if the pixels are sufficiently close, they undergo the same or sufficiently similar irradiance. At this point, a series of pixel examples have been formed that link the input image 102 RGB of the binned colors of dye to input image RGB of the reference color (for example, white). The number of examples may be enormous; one might have 100,000 or even 1,000,000 pixel pairs in a given video frame. However, some examples may be inconsistent, and some image RGB values may have no entry.

A consistent entry for each input image 102 of m by n pixels 124 RGB value that occurs in an example is accomplished by identifying the mode of the example (mode here is used in a statistical sense). The completed table may have some missing entries (where there are no examples). This table is smoothed using a Gaussian to ensure consistency across the color spectrum and to fill in the missing entries. For cases where the value cannot be interpolated, extrapolation is used instead. An alternative method for filling the table is to assume that the scene is lit by a single light source. In this case, the table can be replaced by a single illumination multiplier, which would be computed by using the mode of the ratio of intensities.

2.2 What Basis Colors are Present?

What binned color 136 is present in a given pixel 124 is determined with a color classifier 134 that quantizes the color 130 of each pixel 124 to a pre-determined finite set (determined by the user) based on the pixel's component colors. The classifier 134 is a set of one-versus-all logistic regressions on first and second order powers of RGB and HSV color spaces. To classify pixels 124, the maximal response from the array of classifiers is selected, except when all classifiers respond weakly, in which case the pixel is labeled as ambiguous. Pixels close to color boundaries are not classified, because blur effects in the camera can lead to classifier errors. At present, either a user may click on each color to train the classifier, or a known reference image is used. For an image to be replaced or erased, it must be identified somehow as the reference image.

2.3 Interpolating, Smoothing, and Blending

A pool of relevant pixels that comprise the reference region (where, in the image, a deformed or undeformed reference image is located) is used to determine what basis color is present in the reference image. When the basis color is determined, that color is looked up in the color table to determine the color's RGB values. The result of processing all of the pixels in the reference region is a representation of what the image would look like at that pixel if the dye had been the reference color (again, typically white, but may be any other color). However, not every pixel is able to be classified—the pixel might be close to a boundary between two or more colors and thereby would be dangerous to classify. Unclassified pixels are interpolated using a Gaussian weight to sum up nearby pixels, with the variance corresponding to the distance to the nearest pixel. Alternatively, Poisson interpolation may be used.

The resulting irradiance estimates often result in slight color errors. Since observations have been made that color variations in lighting tend to be of low spatial frequency, one may heavily smooth the hue and saturation of the recovered irradiance to correct the slight color errors.

Finally, using a deformation estimation (derived below), the illumination estimate may be combined with the original pixels of the input image to arrive at a 'blank' surface where the reference image has been removed. The remaining pixels of the original image are used for the rest of the output image.

3. Image Replacement

Figure 2B:
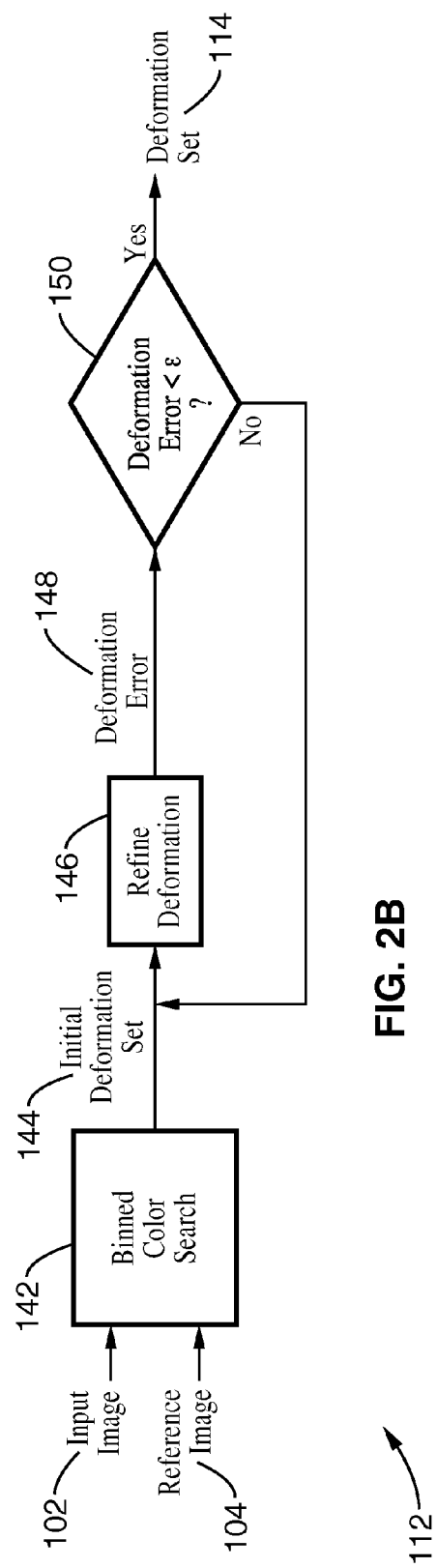
FIG. 2B is a more detailed flowchart of the deformation estimation method taught in this invention.

Refer now to FIG. 2B, a flow chart for the determination of deformation 112. Typically, the estimation of deformation 112 occurs at a coarser pixel scale than the estimation of illumination 108 previously shown in FIG. 2A. Initially, the input image 102 is input into a binned color search 142 along with the reference image 104. A rough color correspondence is used to detect an initial deformation set 144. This initial deformation set 144 is sent through an iterative deformation refinement step 146 where a deformation error 148 is output. The deformation error 148 is tested 150 against a preset limit $\epsilon$ to determine if the deformation error is sufficiently small. If the error exceeds the preset limit $\epsilon$, then the deformation set 114 is again fed through the iterative deformation refinement step 146. When the deformation error is less than the preset limit $\epsilon$, then the iterations conclude, and the deformation set 114 is output. The deformation is used to deform a replacement image 106 (or logo). This new image is composited onto the illumination estimation by multiplication, revealing the retextured image. The method used here first builds a non-parametric regression estimate of irradiance (as shown later in section 2). Then, a simple correspondence reasoning is applied to obtain texture coordinates (as shown later in section 3), from either a frontal view of the texture or a known, reference image. This information is then composited using a replacement image to produce output an output image frame. There is no elastic model of the material and no dynamical model of correspondence—the video is handled frame by frame, solely using the image information present in the frame.

A set of deformations are needed from our observed image that map the undeformed reference image to that which is present in the input image. There are two possible strategies. First, an engineered reference image could be designed that worked as a map of known color properties. This would allow an easy determination of where a particular color lies in the deformed reference image in the input image. This deformation set would allow the ready use of the color classifier outputs to determine which point on the map corresponds to a particular pixel in the deformed reference image. A second method would compare the deformed reference image to an undeformed frontal view of the reference image, which results in a less precise estimate of the deformation set. Both methods may be successfully implemented.

3.1 Using an Engineered Reference Image

A custom printed pattern may be used that is composed of colored geometric primitives (such as triangles, rectangles, parallelograms, pentagons, hexagons, which may be anisotropically scaled as desired) to create high quality patterned reference image. This engineered reference image is designed to ensure that neighborhoods are unique and easily discriminated in subsequent processing using the methods of this invention. As a result, this method for deformation estimation uses an essentially local planar transformation: for each colored geometric primitive of the patterned reference image, a deformation transformation is calculated that maps the undeformed patterned reference image to the possibly deformed image found in the input image. These deformation transformations are used to then stitch together these neighborhoods to compute a complete deformation estimate using nearby deformations transformations to fill in transformation gaps.

Neighborhood maps are encoded by using uniquely colored geometric primitives, which may be triangles, rectangles, or other easily recognized shapes: the shapes are detected independently, the binned basis colors in the geometric primitives are used to determine their identity (e.g. red input is part of a red primitive), then a deformable model is used to localize the vertices—creating an accurate transformation between domains. When geometry primitives are detected and correspondences computed properly, this process is very accurate: experiments indicate that typical errors are less than a third of a pixel. At this point, detailed texture coordinates may be obtained by a bilinear interpolation within each geometric primitive.

3.2 Using an Undeformed Reference Image

While the Patterned Reference Image approach described above in Section 3.1 is compelling, it is somewhat specific to the custom printed pattern. For arbitrary screen printed images, deformation estimation becomes a problem. Instead, here a top-down method is adopted to map an undeformed reference image to the deformed reference image. This process will be detailed below.

Figure 3A:
FIGS. 3A-3D are representations of the iterative steps used in the deformation estimation method taught in this invention to develop increasingly accurate deformation estimates.

Refer now to FIGS. 3A-3D, which are a series of triangulations on a reference image. In FIG. 3A, a search for the rough shape of the deformed reference image is found where an initial deformation estimate is found that roughly transforms the undeformed reference image to that found in the input image. This is indicated by the square white area surrounding the text "CAMEL'. There is one diagonal line traversing the square from upper right to lower left, and it is apparent that the rotational alignment of the text "CAMEL" and the square deformation estimation are off by perhaps 5 degrees. Next, the deformation estimate is refined. Here, a white triangular mesh is used in all of the FIGS. 3A-3D to represent the deformation transformation, splitting triangles as the mapping is refined.

Figure 3B:

In FIG. 3B, we see that the deformation mapping has rotated the deformation box to be in rough alignment with the tilted text "CAMEL". There may also have been some degree of deformation (a shortening) of the lower right triangle.

Figure 3C:

In FIG. 3C, the deformation mesh of FIG. 3B is subdivided from two triangular regions to 8 triangular regions.

Figure 3D:
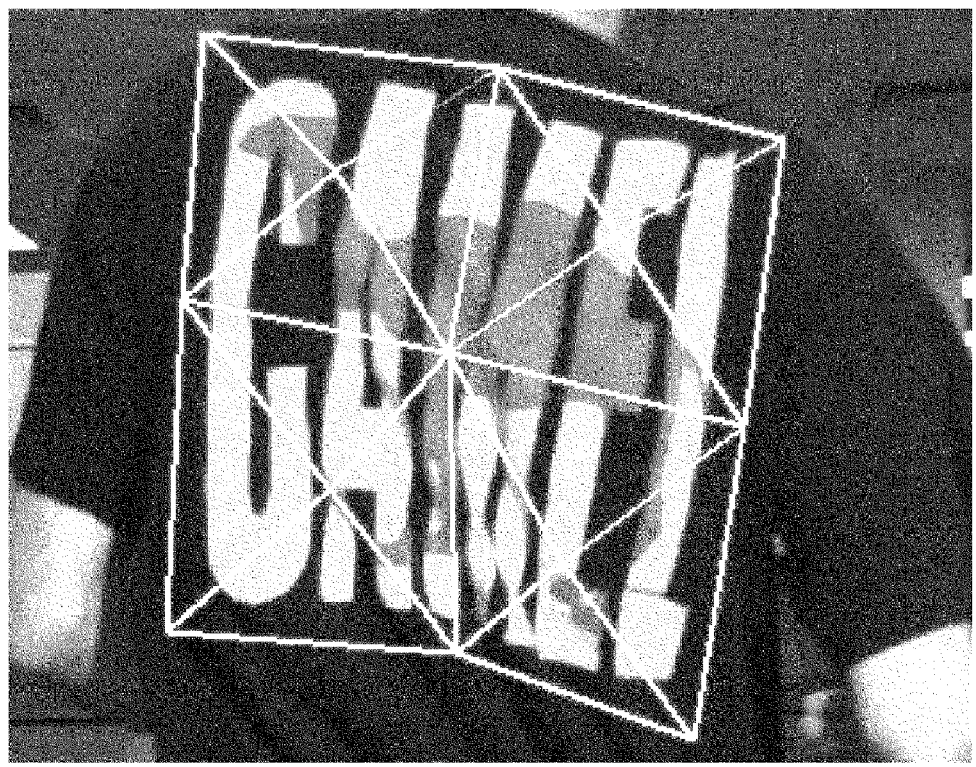

Finally, in FIG. 3D, we see the same 8 deformation regions mapped from those of FIG. 3C to better take into account the localized deformation of the "CAMEL" screen print on the person's shirt. Here, extensive localized deformation is apparent in the triangles of the lower right region (near the camel's rear hooves).

This method of deformation estimation has several advantages. First, no region of the undeformed reference image needs to be particularly discriminated, only the undeformed reference image as a whole has to be unique. Second, highly oblique views still exhibit the overall shape of the reference image and can be detected. Third, reference image edges are powerful cues in this model: they provide a constraint that isn't easily recorded using point feature correspondences. Fourth, in contrast to surface energy methods, this method does not have many of the common numerical stiffness difficulties.

To implement undeformed reference image deformation estimation, two basic steps are performed. First, an initial deformation estimate between the undeformed reference image and the deformed (or possibly not deformed) reference image found in the input image. Second, the deformation estimate between the undeformed and deformed image is iterated until a sufficiently accurate deformation estimate is formed. These steps are described further below.

An Initial Deformation Estimation

Refer back to FIG. 3A, that shows an initial deformation estimate. The method of deformation estimation proceeds in two steps: first, estimate the rough location and scale of the deformed reference image, then refine the deformation estimate. Because the undeformed reference image has fewer lighting effects, both stages are performed on the output of the color classifier, not the original image. To detect the rough location of the object a color histogram with 16 spatial bins (arranged in a 4×4 grid) is used, and the same number of color bins as colors in the undeformed reference image, resulting in a histogram of size 4×4×C.

In the histogram, a count is the number of pixels of each class in each histogram bin. Following other work with histograms, these histogram counts are normalized, values above 0.2 are suppressed (set to zero), then the histogram is re-normalized. Using a color from the undeformed reference image as a query, a combinatorial search is performed over scale, location and aspect ratio in a down sampled version of the deformed reference image.

Refining the Deformation Estimation

Refer now to FIGS. 3B-3D, which are showing an iterative refinement of the initial deformation estimate of FIG. 3A. Once the initial deformation estimate has been computed, a more refined deformation estimate is iteratively computed (FIGS. 3B-3D). At each stage in the refinement, the same algorithm is implemented: blur the color quantized image (giving each quantized color its own channel), then run gradient descent over the locations of the geometric primitive vertices using the sum of squared distances between the deformed reference image and the blurred undeformed reference image.

The color quantized image is blurred to make correspondence matching more robust. It allows the algorithm to ignore the details when making a coarse estimate of the deformation. This method of transformation estimation starts with a 4 vertex 2 triangle model, then is refined to 9 vertices and 8 triangles, and finally refined to 13 points and 16 triangles.

3.3 Frontal Texture Estimation

In general, a frontal view of a texture is required to compute the surface normal vectors in an arbitrary image. D. A. Forsyth, shape from texture without boundaries", In Proc. ECCV, volume 3, pages 225-239, 2002, considered the case of a single view of a repeating pattern, and showed that three views of the repeating pattern (assuming no degeneracies) are sufficient to determine the frontal view. This method assumes that texture elements are small and therefore approximately planar. This notion is extended here to larger textures with repetition in time instead of repetition in space. By observing a video of a moving non-rigid texture, the frontal view may be estimated by assuming that small regions of the texture are roughly flat. By stitching together the estimated frontal appearance of each small region, the frontal appearance of the entire texture may be calculated.

As a result, the shape of a deforming surface can be reconstructed from a single video having sufficient frames so as to not be degenerate. All that is required is that the user selects a reference image to track by clicking four points in a single frame of the sequence.

Because this invention operates under the same assumptions as D. A. Forsyth referred to above, this procedure requires only three views of the deforming surface, typically three frames in a video sequence. However, in practice typically more frames are needed—a degeneracy in any triangle can cause problems in the resulting mesh. In dynamic video sequences a short segment is often sufficient to resolve any potential problems with degeneracy.

3.4 Implementing Frontal Estimation

Assuming a mesh of static connectivity that tracks the deformed reference image over a sequence of frames, each triangle is treated separately. A 3D reconstruction can be computed (with some sign ambiguities) assuming orthography from 3 planar points. Sets of three triangles are extracted, a 3D reconstruction is computed, and the reconstruction is checked for degeneracies by computing the angles between cameras and adding the lengths of each edge to running edge length lists for each edge. After iterating over sets of three views of each triangle and iterating over triangles in the mesh, a list of estimated edge lengths for each edge in the mesh is developed. Then a median edge length value is chosen, and finally spring energy term is minimized to confine the points to a plane.

4. Other Examples

Figure 4A:
FIG. 4A is a picture of an engineered reference image disposed upon a shirt a student is wearing.

Refer now to FIGS. 4A-F, where a sequence of retextured images are displayed. In FIG. 4A, a shirt is shown on a person. The back of the shirt comprises 24 triangular regions of various shades (in reality these would be color, but are shown here in diffused black and white). Here, the reference pattern is the entire grouping of interspersed 24 triangular regions.

Figure 4B:
FIG. 4B is a picture of the engineered reference image of FIG. 4A replaced with the reference color (here the background color of the shirt) to give the effect of removing the engineered reference image.

Refer now to FIG. 4B, where the methods of this invention have been practiced, and the reference color (which was originally some shade of off-white) has completely replaced the reference pattern. Note that the folds on the shirt and all of the lighting effects are substantially identical between FIGS. 4A and 4B. In essence, here the replacement image is just a single uniform image comprising the reference color.

Figure 4C:
FIG. 4C is a picture of the engineered reference image of FIG. 4A replaced with a replacement image that is a graphic of an analog clock with a time of 4:13.

Refer now to FIG. 4C, where the replacement image is that of an analog clock that indicates about 4:13 with readily discernable numbering, long hand, and short hand. Again, the folds on the shirt and all of the lighting effects are substantially identical between FIGS. 4A and 4C. All that has been done to the image is that the reference has been replaced with the replacement image.

Figure 4D:
FIG. 4D is a picture of the engineered reference image of FIG. 4A replaced with a replacement image that is a graphic of an analog clock with a time of 11:20, where shirt folds run from lower left to upper right.
Figure 4E:
FIG. 4E is a picture of the engineered reference image of FIG. 4A replaced with a replacement image that is a graphic of an analog clock with a time of 11:25, where shirt folds are substantially vertical.
Figure 4F:
FIG. 4F is a picture of the engineered reference image of FIG. 4A replaced with a replacement image that is a graphic of an analog clock with a time of 11:30, where shirt folds run from lower right to upper left.

FIGS. 4D, 4E, and 4F respectively show the analog clock at a succession of times, with 11:20 indicated in FIG. 4D, 11:25 indicated in FIG. 4E, and 11:30 indicated in FIG. 4F. Additionally, the folds of FIG. 4D start at the lower left traversing to the upper right. The folds of FIG. 4E are largely absent in the region of the analog clock. Finally, in FIG. 4F, the folds substantially originate at the lower right, traversing up toward the upper left. Thus, several things may be observed.

First, even though the folds of FIGS. 4D-4F are changing from frame to frame, the analog clock remains in appearance as if it were printed on the shirt originally. Additionally, the changing of the indicated time on the analog clocks between the frames indicates that dynamic replacement images may be input to produce images that move from frame to frame. A third observation is that the deformation algorithm used here appears quite robust in dealing with varieties and locations of folds in clothing.

Refer now to FIGS. 5A-5F, which are another example of this invention applied to a plastic bag.

Figure 5A:
FIG. 5A is picture of a plastic bag with a Domino's Pizza™ logo placed thereon.

Refer now to FIG. 5A, which is a plastic bag with a Domino's Pizza™ logo placed upon it. It should be noted that the logo is a color graphic with red dice placed above the blue background of the Domino's Pizza™ text. The actual text is in the same color as the bag, which will be used as the reference color. Here, the reference image is the entire logo. It should be noted that there are extensive folds and localized deformations in the bag, such that the "min" in the "Domino's" is tilted almost to the point of being occluded.

Figure 5B:
FIG. 5B is a picture of the bag of FIG. 5A where the reference image (the Domino's Pizza™ logo) has been replaced with the replacement image that is a Computer Vision Research Task Force logo.
Figure 5C:
FIGS. 5C-5F are more image frames of the input image of FIG. 5A, where the bag has been jostled so as to produce other orientations and differing fold patterns that have regardless been replaced with the Computer Vision Research Task Force logo apparently faithfully representing the folds and illumination.
Figure 5D:
Figure 5E:
Figure 5F:

Refer now to FIG. 5B, which is the bag of FIG. 5A with the reference image replaced with the replacement image that is a graphical version of the Computer Vision Research Task Force. It is apparent that the replaced output image is quite believable, in that it appears to have always been on the bag. The replacement image shows substantially identical lighting and deformation when compared to the original reference image of FIG. 5A. In the replacement output image of FIG. 5B, the "Vision" of the replacement logo is foreshortened almost to the point of illegibility. However, in the context of the image, it still appears very convincing.

Refer now to FIGS. 5C-5F, which are more image frames of the input image, where the bag has been jostled so as to produce other orientations and differing fold patterns. In these FIGs., it is still believable that the replacement image has always been present, and is not just a computer animated replacement of the reference image. This is particularly interesting due to the high degree of specular highlighting present in these images.

PseudoCode

Appendix A contains high level pseudo code representations of the algorithms and methods taught in this invention. It is to be understood that not every trifling detail is present in such code so that the overall flow of data processing may be better appreciated. As this code is written with descriptors used in both in this specification, and in the claims, it is believed that further explanation would be of limited or no utility.

It should be noted that this pseudo code is representative of just one way of processing input images according to this invention. Where high speed GPUs are utilized instead, these steps may be substantially modified to proceed in a highly parallel manner, with the illumination estimation and the deformation estimation proceeding as parallel processes. In such a fashion, it may be possible to replace either a generic reference image, or an engineered reference image, with either static or moving replacement images in real time.

Ultimately, it may be possible to use the methods taught here for directed video marketing or other post production video processing. One could envision replacing English text in movies with Chinese text in entire movies being directed to Chinese distribution. Presently, only Chinese subtitles are used, with English signs and lettering in the background (e.g. STOP, YIELD, Bank, etc.). Such English language could be replaced with ideograms, or other languages entirely, or other graphics, such as international signs.

An additional possibility is the replacement of a reference image that is an article of clothing with another article of clothing.

Actual Code Listing

Appendix B contains actual C++ code and MatLab listings of software used to generate the examples of applications of the methods of this invention, with labels corrected as necessary to become consistent with the terminology used herein. As this code is written with descriptors used in both in this specification, and in the claims, it is believed to large extent self-explanatory.

It is to be expressly noted that the code in Appendix B is covered under United States and international copyright laws, and that all rights are reserved. The Appendix B code may collectively be referred to as "Automated Image Replacement (AIR) Copyright (c) 2007, The Regents of the University of California, through the University of California Berkeley."

Results and Discussion

This invention has demonstrated the power of image replacement using irradiance on several videos of deforming non-rigid surfaces, including T-shirts and plastic bags. In general, results using an undeformed reference image work better since large numbers of edge length correspondences provide a better replacement image. However, this method of irradiance estimation is robust—meaning that irradiance estimates are correct even when the texture map is coarse (as in FIG. 3D). This is important because irradiance estimates are a powerful cue to human perception of surface shape. As a result, denser maps do not provide better estimates of irradiance. Different reference (or background) colors do not present a problem as shown on a shirt with a dark albedo as well.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. In the appended claims, reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present disclosure and claims. Moreover, it is not necessary for a device or method to address each and every problem sought to be solved by the present invention, for it to be encompassed by the present disclosure and claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

APPENDIX A

Computer Program Pseudo Code

```
define function image_replace(input_image, reference_image,
            replacement_image)
    function locate_reference_image(input_image, reference_image) →
            target_region
    function illumination_estimation(input_image, target_region,
            bin_color_models, bin_multipliers) →
            illumination_image
    function deformation_estimation(input_image, reference_image,
            target_region) → deformation_set
    function deform_replacement_image(deformation_set,
            replacement_image) →
            deformed_replacement_image
    function apply_illumination(deformed_replacement_image,
            illumination_image) →
            completed_replacement_image
    return function composite_image(input_image,
            completed_replacement_image, target_region)
define function locate_reference_image(input_image, reference_image)
    if type(reference_image) == engineered_reference_image
        function extract_blobs(input_image) → blobs
        function find_connected_component(blobs) → target_region
    else
        function make_color_histogram(reference_image) → color_histogram
        function find_color_histogram(input_image, color_histogram) →
            target_region
    end if
return target_region
define illumination_estimation(input_image, target_region,
bin_color_models,
            bin_multipliers)
    0 → illumination_multipliers_image
    for each pixel in target_region
        function find_pixel_bin(pixel, bin_color_models) → binned_color
        function table_lookup_multiplier(binned_color, bin_multipliers) →
            illumination_multiplier
        add illumination_multiplier to illumination_multipliers_image
    next pixel
return input_image times illumination_multipliers_image
define function deformation_estimation(input_image, reference_image,
            target_region)
    if reference_image is special_pattern
        function extract_blobs(input_image, target_region) → target_blobs
        function assign_deformation(target_blobs) → deformation_set
    else
        deformation_set = target_region
        repeat
            function refine_deformation(deformation_set, deformation_level,
                deformation_limit) → deformation_set
        until deformation_level ≤ deformation_limit
    end if
return deformation_set
define deform_replacement_image(deformation_set,
replacement_image) % %
% % this routine be implemented directly on graphics processing units (GPUs)
    process(deformation_set on replacement_image) →
deformed_replacement_image
return deformed_replacement_image
define function apply_illumination(deformed_replacement_image,
```

APPENDIX A-continued

Computer Program Pseudo Code

```
            illumination_image)
return deformed_replacement_image times illumination_image
define composite_image(input_image, completed_replacement_image,
            target_region)
    in target_region of input_image insert completed_replacement_image
return input_image
define estimate_reference_image(image_sequence,
deformed_reference_image)
% deformed_reference_image is a hand labeled region in one image of the
% (deformed) reference image. This function computes the undeformed
% reference_image and can be run before image_replace on an image
sequence
    0 → deformation_sets
    for image in image_sequence
        function locate_reference_image(image,
                deformed_reference_image) → target_region
        function deformation_estimation(image, deformed_reference_image,
                target_region) → deformation_set
        add deformation_set to deformation_sets
    0 → reference_image
    for small_deformation in deformation_sets
    % this takes the small deformation for a consistent region across
    % multiple images
        function compute_frontal_view(small_deformation) →
piece_reference_image
        add piece_reference_image to reference_image
    return reference_image
define function extract_blobs(input_image)
    0 → blobs
    function compute_image_gradient(input_image) → image_gradient
    for each region below gradient_threshold
        find pixels below distance_threshold from region → blob
        add blob to blobs
    return blobs
define function find_connected_component(blobs)
    function compute_neighbor_blobs(blobs) → neighbor_matrix
    function compute_cliques(neighbor_matrix) → cliques
return max(cliques)
define function make_color_histogram(reference_image)
    0 → color_histogram
    for each color in reference_image
        for x in {1,4}
            for y in {1,4}
                function count_region_color_pixels(x,y,color,
                            reference_image) → color_count
                function size_region(reference_image, x, y) → pixel_count
                color_count / pixel_count → color_histogram{color,x,y}
            next y
        next x
    next color
    return color_histogram
define function find_color_histogram(input_image, color_histogram)
    0 → distances
    for each region in input_image
        function make_color_histogram(region) → region_histogram
        function histogram_distance(color_histogram, region_histogram) →
distance
        add distance to distances
    return region from argmin(distances)
```

What is claimed is:

1. A method for modifying an input image, comprising:
   providing a computer;
   providing a reference image to the computer;
   providing an input image to the computer, said input image including at least some portion of the reference image;
   providing a replacement image to the computer; and
   replacing, by using the computer, the portion of the reference image included in the input image with the replacement image, by performing steps comprising:
   (I) estimating illumination to form an illumination image; and
   (ii) estimating deformation to create a deformation set;
   (iii) wherein the deformation set maps the replacement image to a deformed replacement image.

2. The method recited in claim 1, wherein said replacing the reference image on an input image with a replacement image further comprises:
applying the illumination image to the deformed replacement image to form a completed replacement image; and
compositing the completed replacement image onto the input image to form a replaced input image.

3. The method recited in claim 1, wherein said estimating illumination to form an illumination image comprises:
forming a target region by locating a set of pixels depicting at least part of the reference image within the input image;
classifying each of the target region pixels into one color bin of a set of color bins representative of the reference image; and
multiplying each pixel in the target region by an illumination multiplier associated with the color bin classified for the pixel to produce an illumination image.

4. The method recited in claim 1, wherein said estimating deformation to create a deformation set comprises:
(a) forming a target region by locating a set of pixels depicting at least part of the reference image within the input image;
(b) determining bins of color within the target region by using steps comprising:
(i) forming a color gradient of the target region of the input image;
(ii) agglomerating groupings of color within a color threshold of a local minimum within the color gradient;
(iii) classifying each pixel in each agglomerated grouping to a color bin, each color bin representative of the reference image;
(iv) detecting pixels in the target region where the color gradient exceeds the color threshold of the local minimum of the color gradient; then labeling such detected regions as ambiguous pixels;
(v) determining color values for the ambiguous pixels from the agglomerated groupings with numerical methods; and
(vi) agglomerating the ambiguous pixels to their corresponding color bins;
(c) regressing an initial deformation set that maps the reference image to the deformed replacement image in an iterative fashion until a mapping error is less than or equal to a deformation limit;
(d) wherein the color bins of the deformed replacement image correspond to a set of color bins for the reference image.

5. The method recited in claim 3, wherein the illumination multiplier is determined through steps comprising:
determining a reference color, where the reference color has a reference color irradiance; and
dividing an irradiance of each of the color bins (of the set of color bins representative of the reference image) by the reference color irradiance.

6. A non-transitory computer readable medium comprising programming executable on a computer for performing the method of claim 1.

7. An image-based rendering method for retexturing fast-moving, deforming objects in video while preserving original lighting, comprising:
(a) providing a computer;
(b) providing a reference image to the computer;
(c) providing a set of two or more successive input images to the computer;
each of said successive input images including at least some portion of the reference image; and
(d) for each of said successive input images, performing on the computer a set of steps comprising:
(i) locating the portion of the reference image within the input image to form a target region;
(ii) forming an illumination estimate by estimating the illumination of the input image by using color reasoning;
(iii) forming a deformation estimate by estimating a deformation of the target region of the reference image within the input image by using correspondence reasoning;
(iv) forming a deformed replacement image by applying the deformation set to the replacement image;
(v) forming a completed replacement image by applying the illumination image to the deformed replacement image;
(vi) forming a composited image by compositing the completed replacement image to the target region of the input image; and
(vii) outputting the composited image as an output image corresponding to the input image.

8. The method recited in claim 7, further comprising:
estimating an undeformed frontal view of the portion of the reference image from said successive input images of the portion of the reference image within each successive input image.

9. The method recited in claim 7, wherein the forming the deformation estimate is obtained by using a known, engineered pattern.

10. The method as recited in claim 7, wherein the using color reasoning step further comprises:
building a color look-up table that indicates, for each of a plurality of independent basis colors present in the reference image, the appearance of a reference color in illumination that produces a given set of image R, G and B values from each independent basis color; and
at each reference image pixel location, determining the basis colors present, and using the color look-up table to estimate the appearance of the reference color at that a location of the reference image pixel.

11. The method recited in claim 10, further comprising:
using a color classifier to classify pixels from one of the basis colors that lie next to pixels produced by the reference color.

12. The method recited in claim 11, further comprising:
determining what basis colors are present from a pool of the classified pixels; and
presenting RGB values to the color look-up table indicated by that basis color.

13. The method recited in claim 12, further comprising:
using a custom printed pattern composed of geometric primitives to create a high quality deformation estimate.

14. The method recited in claim 13, further comprising:
using a triangle mesh to represent the deformation estimate; and
splitting triangles as the deformation estimate is iteratively refined.

15. The method recited in claim 14, further comprising:
forming the deformation estimate that incorporates the location and scale of the reference image within the input image.

16. A method image replacement, comprising:
(a) providing a computer;
(b) providing a reference image to the computer;
(c) providing a replacement image to the computer;

(d) providing an input image to the computer; said input image including at least some portion of the reference image; and
(e) performing on the computer a set of steps comprising:
  (i) locating the portion of the reference image within the input image to form a target region;
  (ii) forming an illumination image by estimating the illumination of the input image;
  (iii) forming a deformation set by estimating a deformation of the target region of the reference image within the input image;
  (iv) forming a deformed replacement image by applying the deformation set to the replacement image;
  (v) forming a completed replacement image by applying the illumination image to the deformed replacement image;
  (vi) forming a composited image by compositing the completed replacement image to the target region of the input image; and
  (vii) outputting the composited image as an output image corresponding to the input image.

17. The method recited in claim 16, further comprising:
forming the deformation set by tracking the deformed reference image in two dimensions to replace the deformed reference image with the deformed replacement image.

18. The method recited in claim 16, wherein the forming the illumination image step comprises:
estimating local irradiance of the input image to provide strong cues of a fine scale structure in an actual lighting environment.

19. The method recited in claim 18, wherein the estimating local irradiance step comprises:
classifying pixels according to color; and
computing irradiance for a given color.

* * * * *